US008801407B2

(12) United States Patent
Simpson

(10) Patent No.: US 8,801,407 B2
(45) Date of Patent: Aug. 12, 2014

(54) HYBRID ELECTRO-HYDRAULIC POWER DEVICE

(75) Inventor: Edwin K. Simpson, Rock Hill, SC (US)

(73) Assignee: Harris Waste Management Group, Inc., Cordele, GA (US)

( * ) Notice: Subject to any disclaimer, the term of this patent is extended or adjusted under 35 U.S.C. 154(b) by 1206 days.

(21) Appl. No.: 12/711,576

(22) Filed: Feb. 24, 2010

(65) Prior Publication Data

US 2011/0206537 A1 Aug. 25, 2011

(51) Int. Cl.
*F04B 49/00* (2006.01)
*F04B 23/04* (2006.01)
*F16D 31/02* (2006.01)

(52) U.S. Cl.
USPC ........... 417/429; 417/216; 417/286; 417/287; 417/426; 60/428

(58) Field of Classification Search
USPC ........ 417/1, 216, 286, 287, 426, 429; 60/428, 60/452, 486, 487
See application file for complete search history.

(56) References Cited

U.S. PATENT DOCUMENTS 3,760,689 A * 9/1973 Johnston ......................... 91/519
3,958,472 A 5/1976 Kabanov et al.
3,962,870 A * 6/1976 Lech ............................... 60/428
3,985,472 A * 10/1976 Virtue et al. .................. 417/216
4,008,571 A * 2/1977 Evans ............................. 60/423
4,809,586 A * 3/1989 Gage et al. .......................... 91/6
4,928,487 A 5/1990 Nikolaus
5,165,862 A * 11/1992 Lindblom ..................... 417/216
5,284,249 A * 2/1994 Lawrence et al. ............. 209/169
5,653,107 A 8/1997 Beck
5,775,881 A * 7/1998 Stich ............................ 417/287
5,778,671 A * 7/1998 Bloomquist et al. ............ 60/456
6,029,445 A * 2/2000 Lech ............................... 60/422
6,299,427 B1 10/2001 Bulgrin et al.
6,419,460 B1 7/2002 Dantlgraber
6,494,685 B2 12/2002 Carstensen
6,652,239 B2 11/2003 Carstensen
6,890,156 B2 5/2005 Watson et al.
6,904,993 B1 6/2005 Rinck
6,935,111 B2 8/2005 Dantlgraber
7,080,508 B2 7/2006 Stavale et al.
7,202,619 B1 4/2007 Fisher
7,273,122 B2 9/2007 Rose
7,399,165 B2 * 7/2008 Horiuchi et al. ................ 417/42
2008/0288115 A1 11/2008 Rusnak et al.
2009/0304521 A1 12/2009 Kernan et al.
2010/0034665 A1 * 2/2010 Zhong et al. .................... 417/42

FOREIGN PATENT DOCUMENTS

EP 1213174 6/2002

* cited by examiner

*Primary Examiner* — Peter J Bertheaud
(74) *Attorney, Agent, or Firm* — Perman & Green, LLP

(57) ABSTRACT

A hydraulic power device for effecting operation of at least one load, the hydraulic power device including a motor having a predetermined motor speed rating and motor power rating, at least one pump operably coupled to the motor, the pump being configured to provide, to the at least one load, a predetermined hydraulic fluid flow at the predetermined motor speed rating, and a variable frequency drive connected to the motor, the variable frequency drive being configured to effect operation of the motor at a speed above the predetermined motor speed rating such that the at least one pump operates to provide an excess hydraulic fluid flow during operation of the motor substantially above the predetermined motor speed rating where the excess fluid flow is greater than the predetermined hydraulic fluid flow.

21 Claims, 6 Drawing Sheets

HYBRID ELECTRO-HYDRAULIC POWER DEVICE

BACKGROUND

1. Field

The exemplary embodiments generally relate to hydraulic power units and, more particularly, to controls for hydraulic power units.

2. Brief Description of Related Developments

Generally hydraulic pumps used in mechanized equipment such as, for example, recycling shears and bailers have a higher speed rating than the motors which power the pumps thereby limiting the flow of the pump. To compensate for speed rating of the motor, a fixed volume pump may be coupled with a variable volume pump to obtain a greater flow rate through the hydraulic system.

Generally, the installation of a variable flow and/or fixed volume pump includes a fixed speed electric motor. The controls for the variable volume pump generally include a torque limiter that limits the torque load on the motor. Also known as a constant horsepower control, the torque limiter maximizes the flow output of the pump without overloading the motor. For example, referring to FIG. 1, as the pump pressure increases (i.e. the motor torque needed to pump the fluid increases) the input power needed by the motor also increases. The torque limiter control takes control of the flow when the input power reaches the power rating of the fixed speed motor. The fluid flow is then regulated such that the power required by the motor remains constant as the pressure increases. It is noted that if a variable volume pump is installed with a fixed volume pump, the flow from the variable volume pump may be increased or decreased even though the driving motor remains at a constant or fixed speed.

A typical power unit pump for mechanized equipment may include a torque limited piston pump (variable volume pump) coupled with a fixed volume vane pump (or gear pump). Generally, both of the pumps are driven by a fixed speed electric motor. Referring to FIG. 2 as the fluid pressure increases in this typical pump-motor group the power required from the motor also increases. When the motor is loaded to its power rating, any further fluid pressure increase would overload the motor. Generally, the fixed volume pump is vented out of the hydraulic circuit and its flow returns directly back to a fluid reservoir of the hydraulic system. The power required by the motor drops as a result of the flow from the fixed volume pump being directed directly back to the reservoir. As the fluid pressure continues to increase (through work of only the piston pump) the power required by the motor again reaches the power rating of the motor. The torque limiting control for the piston pump causes the displacement of the piston pump to decrease thereby reducing the flow from the piston pump. It is noted that the above power unit pump has a flow output through the pumps that is limited by the lower rated speed of the motors powering the pumps.

Further, conventional hydraulic pump and motor systems remain running even when the machine they are integrated into is idle. Generally the motors in these systems have restrictions as to how many times the motor may be started and stopped within a predetermined time period.

It would be advantageous to be able to use pumps in a hydraulic system at their rated speed capacity where the speed rating for the accompanying motor is rated less than the speed of the pump.

BRIEF DESCRIPTION OF THE DRAWINGS

The foregoing aspects and other features of the disclosed embodiments are explained in the following description, taken in connection with the accompanying drawings, wherein.

DETAILED DESCRIPTION OF THE EXEMPLARY EMBODIMENT(S)

Figure 1:
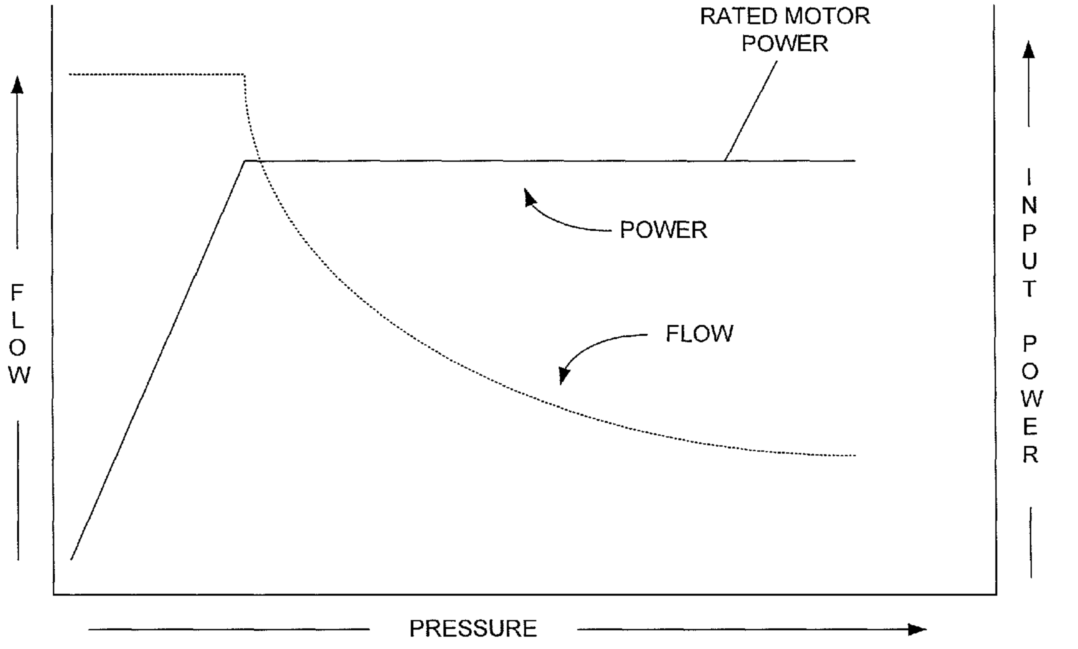
FIG. 1 (PRIOR ART)
FIG. 1 illustrates exemplary power and flow curves for a conventional variable volume, torque limited, pump.
Figure 2:
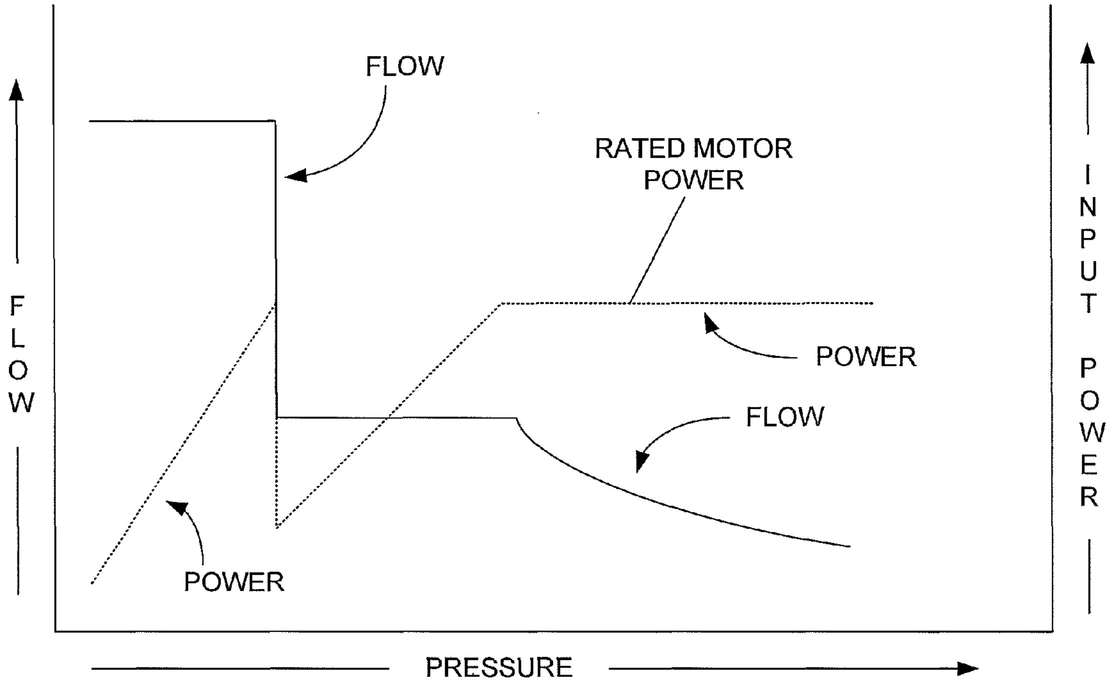
FIG. 2 (PRIOR ART)
FIG. 2 illustrates exemplary power and flow curves for a conventional pump and motor group.
Figure 3:
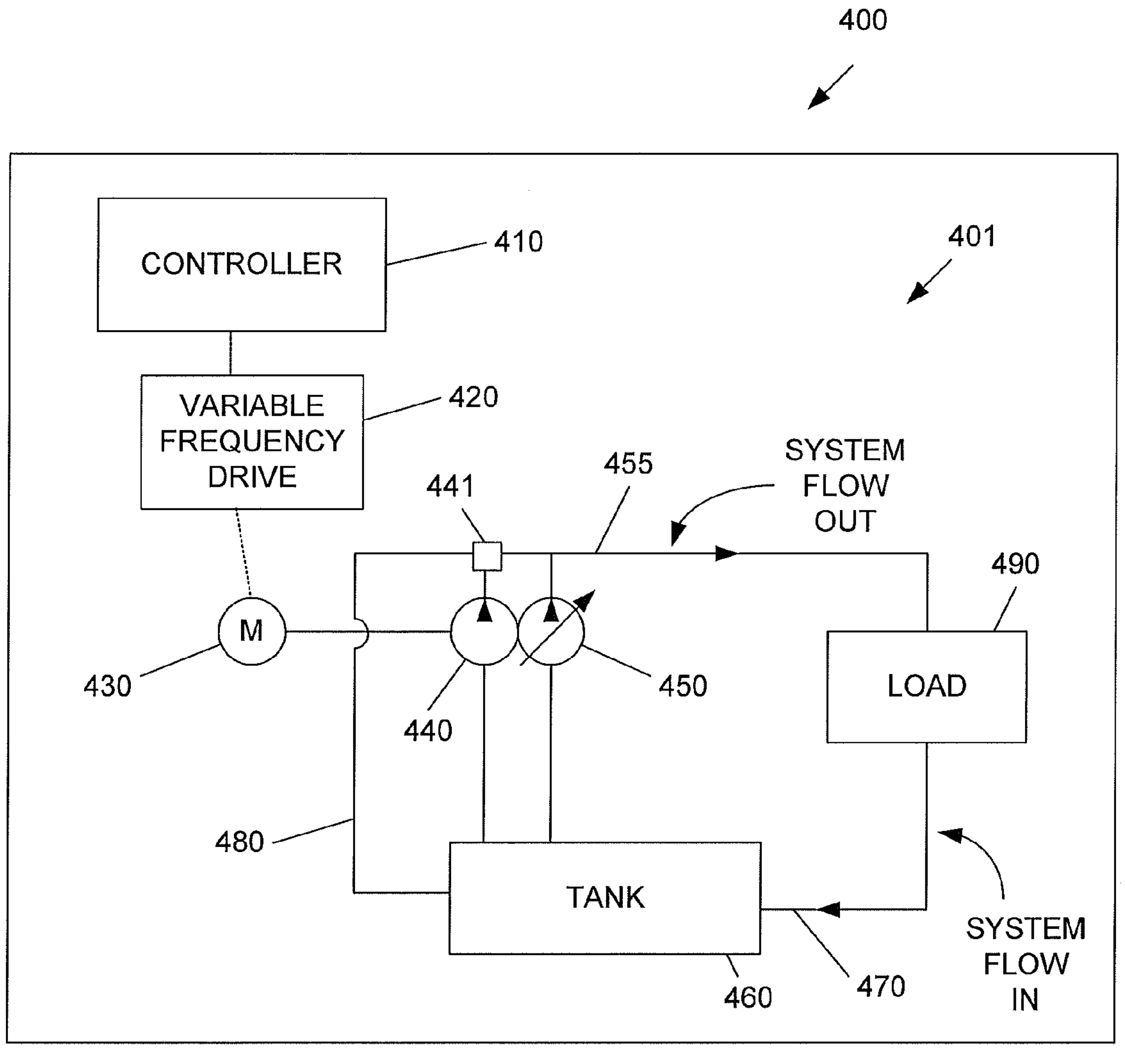
FIG. 3 is a schematic illustration of a machine including a hydraulic system in accordance with an exemplary embodiment.

FIG. 3 illustrates a machine 400 including a hydraulic power system, device or unit in accordance with an exemplary embodiment. Although the disclosed embodiments will be described with reference to the drawings, it should be understood that the disclosed embodiments could be embodied in many alternate forms. In addition, any suitable size, shape or type of elements or materials could be used.

The exemplary embodiments described herein allow a standard unmodified alternating current (AC) electric motor for powering a hydraulic pump system to be run above its speed rating without overloading the motor. In accordance with the exemplary embodiments, a Variable Frequency Drive (referred to herein as "VFD") controls the motor speed to obtain a substantially constant input power of the motor when the motor is operated above its rated speed. Substantially at or below the rated motor speed the VFD controls the motor's speed to allow an upper torque limit (e.g. the rated torque limit) when driving the motor substantially at or below the rated speed. In alternate embodiments the VFD may control the motor's speed to obtain any suitable torque profile when the motor is operated at or below its rated speed. In one exemplary embodiment the VFD may be configured to vary the speed of the motor in any suitable manner for operating the hydraulic power unit. In another exemplary embodiment the VFD may also be configured to stop and restart the motor any suitable number of times.

Figure 3A:
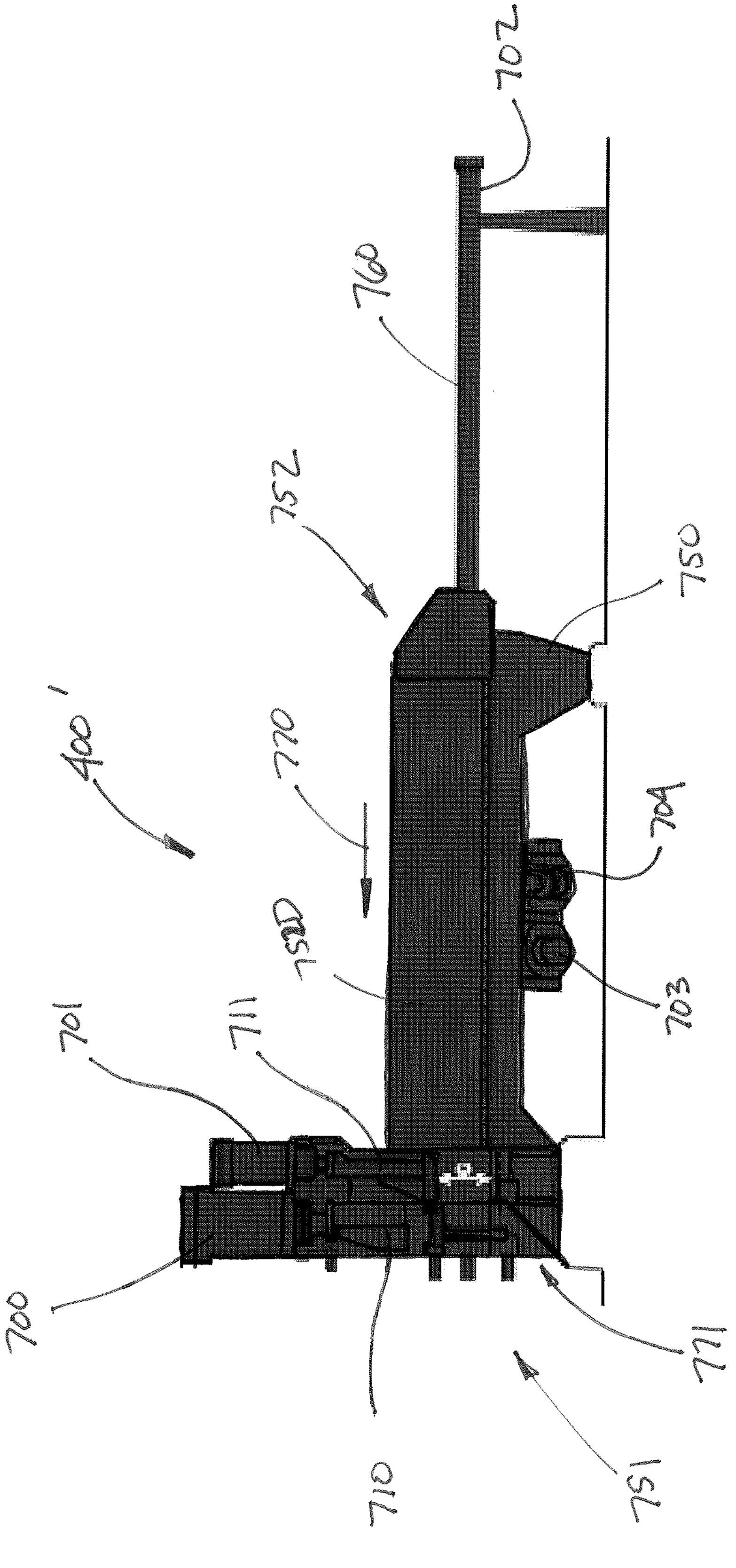
FIG. 3A is another schematic illustration of a machine including a hydraulic system in accordance with an exemplary embodiment.

The machine 400 may be any suitable machine having a hydraulic power unit 401. For exemplary purposes only, the machine 400 may comprise balers, shredders, compactors or shears for material recycling equipment, heavy construction equipment such as e.g. bulldozers, front-end loaders and dump trucks, or any suitable vehicle or tool having a hydraulic power unit. As an example, referring to FIG. 3A, a recycling machine 400' for recycling materials is shown. In this example, the recycling machine 400' includes a shear but in alternate embodiments recycling machine 400' may include a baler for forming bales of scrap material. In still other alternate embodiments the exemplary embodiments may be applied to any suitable machine. In this example, the recycling machine 400 includes a frame 750 having a shear box 751 and a charging box 752. In one exemplary embodiment, the shear box 751 and charging box 752 may be separable from one another. In alternate embodiments the shear box 751 and charging box 752 may have a unitary construction. In operation scrap material is placed within the charging box 752 and is pushed into the shear box 751 by a ram 760 in the direction of arrow 770 where the scrap material is sheared or cut into smaller pieces and discharged from discharge chute 771. The charging box 752 may include doors 752D that move to shape and guide the scrap material so that the scrap material can pass into the shear box 751 as the scrap material is pushed by the ram 760. The shear box 751 may include a stamper or clamp 711 that is configured to hold the scrap material stationary as it is sheared by a shear 710 also disposed within the shear box 751. The recycling machine 400' may have one or more hydraulic power units or systems for operating one or more hydraulic cylinders or actuators. For example, the shearing machine 400' may have hydraulic cylinders 700-704 for causing respective movement of the shear 710, the stamper or clamp 711, the doors 752D and the ram 760. The fluid may be provided to these hydraulic cylinders 700-704 by one or more hydraulic power units 401. In one example each hydraulic cylinder 700-704 may have its own hydraulic power unit 401. In another example, two or more hydraulic cylinders may be powered by a single hydraulic power unit 401 through, for example, suitable valving in the hydraulic system which includes hydraulic lines connecting the hydraulic cylinders to the hydraulic power unit 401.

In this exemplary embodiment, one or more hydraulic power devices or units 401 are mounted to the machine 400 in any suitable manner such as with, for example, suitable brackets or mounting features. In this exemplary embodiment the hydraulic power unit 401 includes a motor 430, a fixed volume pump 440, a variable volume pump 450, a fluid reservoir or tank 460 and a load 490. The motor 430 may be a three-phase induction motor or any other suitable motor. The fixed volume pump 440 may have a constant displacement and the variable volume pump 450 may have a pump control that varies displacement in order to limit the power required to drive it regardless of the pressure in the hydraulic system. It should be understood that the configuration of the hydraulic power unit 401 is shown for exemplary purposes only and in alternate embodiments the hydraulic power unit may have any suitable configuration. For example, the hydraulic power unit may include only a fixed volume pump(s), only a variable volume pump(s), or any suitable combination and number each of the fixed volume and variable volume pumps. For exemplary purposes only, the hydraulic power unit may include one variable volume pump with one fixed volume pump; one variable volume pump with multiple fixed volume pumps; one variable volume pump; one or more fixed volume pumps with no variable volume pumps; or multiple variable volume pumps with no fixed volume pumps.

In this exemplary embodiment, a single motor 430 is configured to drive both the fixed volume pump 440 and variable volume pump 450. In alternate embodiments each pump 440, 450 may have a respective motor where each of the respective motors are operated in a manner substantially similar to that described herein. As may be realized, in one example, the motor 430 may directly drive the pumps 440, 450. In other examples the motor may drive the pumps 440, 450 through any suitable transmission such as, for example, belts and pulleys or a gearbox. For exemplary purposes only, the exemplary embodiments described herein will be described with respect to the motor 430 having a lower speed rating than what may be referred to for descriptive purposes as the pump speed rating of the respective fixed volume and variable volume pumps 440, 450 (e.g. pump speed at or near maximum volumetric efficient flow capacity of the pump).

The fixed volume pump 440 and variable volume pump 450 may draw hydraulic fluid from tank 460 for effecting fluid output to the load 490. The load 490 may be any suitable load such as, for exemplary purposes only, a piston operated hydraulic cylinder or linear actuator such as hydraulic cylinders 700-704. In alternate embodiments the load 490 may comprise a rotary actuator. The output from each pump 440, 450 may be combined in, for example, conduit 455 for increasing a volume of fluid that passes to the load 490 when compared to a volume of fluid provided to the load 490 by a single pump. Here, the fixed volume pump 440 also includes a bypass 480 configured to allow the fluid output by the fixed volume pump 440 to exit the system fluid flow (e.g. the fluid flowing through conduit 455 to the load 490 and fluid flowing through return conduit 470 from the load 490 back to the tank) and return back to the tank 460 without passing to the load 490. As may be realized the bypass 480 may include suitable valving or other flow control devices for directing the fluid flow from the fixed volume pump 440 directly to the tank 460. In alternate embodiments, the fixed volume pump 440 may be configured in any suitable manner to allow its fluid output to be directed directly to the tank 460. In still other alternate embodiments, the variable volume pump 450 may include a bypass for directing at least a portion of its fluid output directly to the tank 460.

The hydraulic power unit 401 also includes VFD 420 connected to the motor 430. The VFD 420 may be any suitable variable frequency drive/controller configured to operate the motor 430 in accordance with the exemplary embodiments described herein. A controller 410 may also be connected to the VFD 420 and/or motor 430. The controller 410 may be any suitable controller, such as for example a programmable logic controller. In one example, the controller 410 may be configured for the general operation of the machine 400 and/or pumps 440, 450 and controlling the flow and pressure delivered by the hydraulic power device 401 as will be described further below. While in this example, the controller 410 and VFD 420 are shown separately it should be understood that in alternate embodiments the controller 410 and VFD 420 may be integral with each other.

In accordance with an exemplary embodiment the VFD 420 is configured to operate the motor 430 at, for example, a speed substantially equal to a rated speed of at least one of the pumps 440, 450 so that an excess fluid flow rate (e.g. a fluid flow rate above a predetermined hydraulic fluid flow rate of the pump(s) at the predetermined motor speed rating up to a maximum excess fluid flow rate) can be achieved in the hydraulic system effecting substantially rapid actuation of, for example, the hydraulic cylinders 700-704. In one exemplary embodiment, to operate the pumps 440, 450 at substantially the rated speed of at least one of the pumps 440, 450 the VFD is configured to operate the motor 430 at a speed greater than the rated speed of the motor. For example, if a motor is rated at, for example about 60 Hz the VFD 420 may be configured to operate the motor at about 77 Hz or any other suitable frequency above the rated frequency of the motor 430. If for example, the motor runs at about 1800 rpm at about 60 Hz, running the motor at about 77 Hz may increase the speed of the motor to about 2300 rpm, which would also increase the corresponding speeds of the fixed volume and variable volume pumps 440, 450. This increase in pump speed from about 1800 rpm to about 2300 rpm may result in about a 28% increase in flow than would be expected from the pump(s) at 1800 rpm. As may be realized, the VFD 420 allows substantially full utilization (e.g. operation at rated speed) of one or more of the pump(s) when the rated speed of the motor 430 is below the rated speed of the pump(s) 440, 450. As may also be realized, where the motor 430 drives more than one pump 440, 450, as in this exemplary embodiment, the speed of the motor 430 may be increased, for example, to the rated speed of the pump having the lowest speed rating. (In alternate embodiments the speed of the motor may be increased to be above the rated speed of the motor but less than the rated speed of the pump having the lowest speed rating. In other alternate embodiments, the motor speed may be raised over the rated speed of the motor but less than the rated speed of the pump having the higher speed rating.) For example, if one pump driven by the motor 430 has a speed rating of about 2300 rpm and the other pump driven by the motor 430 has a speed rating of 2500 rpm the motor speed may be increased so that the pumps operate substantially at 2300 rpm to substantially prevent damage to the lesser rated pump. Once excess fluid flow in the hydraulic system cannot be sustained (e.g. when the input power for the motor substantially exceeds the rated input power for the motor or as the fluid pressure within the hydraulic system increases) the VFD 420 operates the motor so that maximum power is maintained even though fluid flow through the hydraulic system may be decreased as will be described below.

Figure 4:
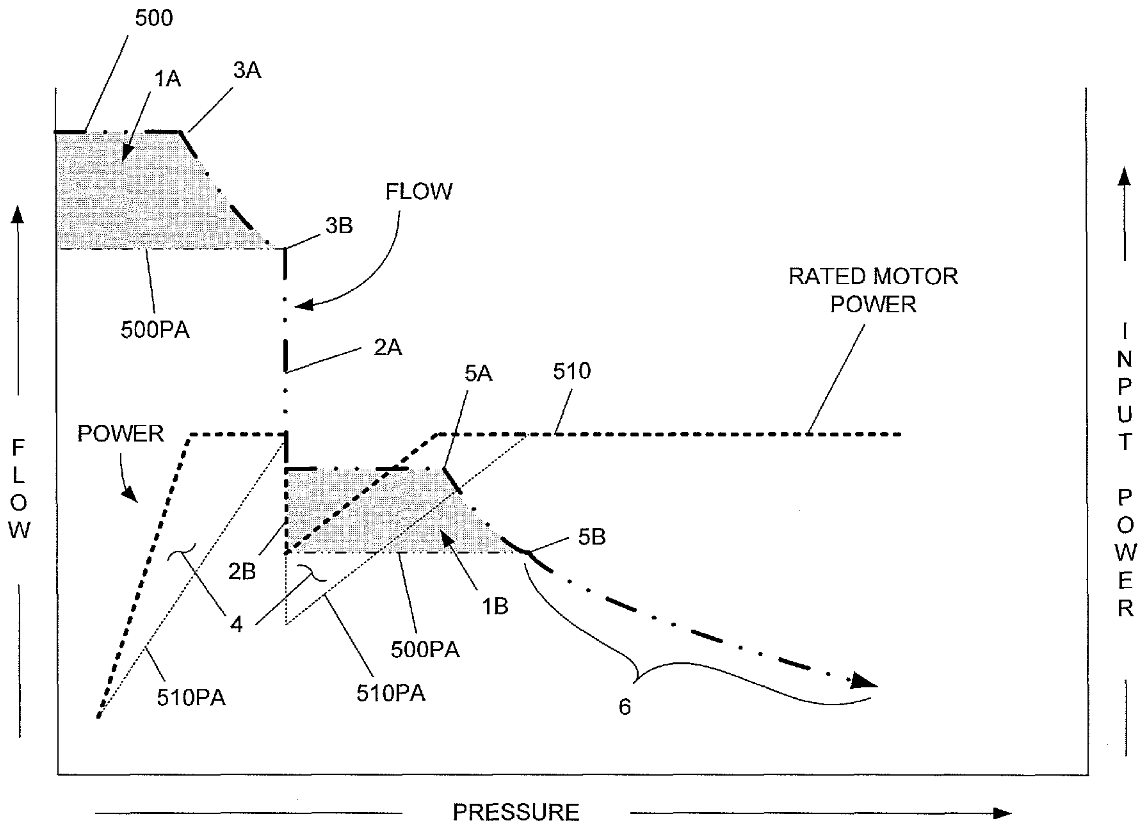
FIG. 4 illustrates exemplary power and flow curves for a pump/motor group in accordance with an exemplary embodiment.

Referring also to FIG. 4 an operation of the hydraulic power unit 401 will be described in accordance with an exemplary embodiment. As can be seen in FIG. 4, line 500 illustrates the flow output by the fixed volume and/or the variable volume pumps 440, 450 versus the hydraulic pressure. Line 510 illustrates the power of the motor 430 versus the pressure of the hydraulic system.

Figure 5:
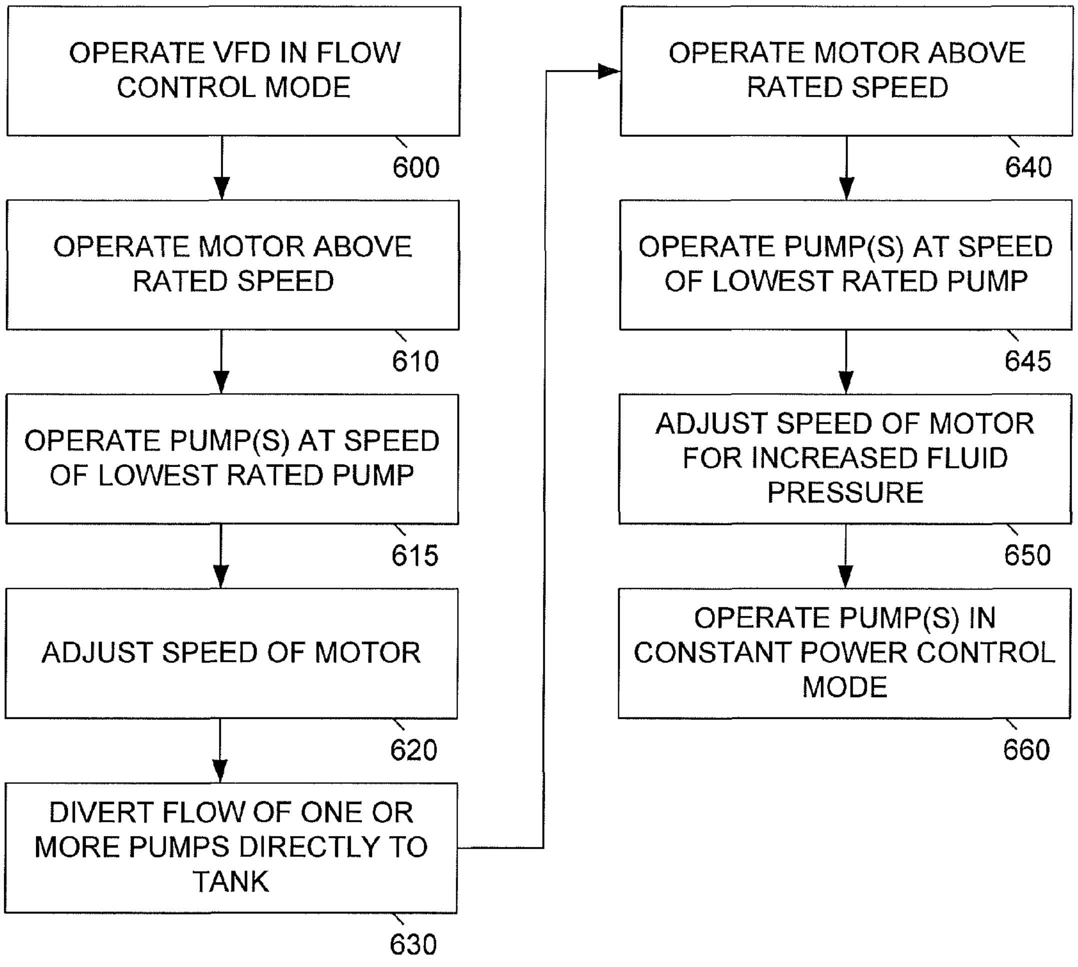
FIG. 5 illustrates a flow diagram in accordance with an exemplary embodiment.

In this example, the VFD 420 controls, for example, the voltage, current and frequency going to motor 430. As may be realized, the motor 430 may have a rated value for voltage, current, power, torque and frequency. The motor 430 may be allowed to operate at a higher than rated speed (RPM) as long as the rated power is not exceeded. The VFD 420 may be configured to allow for the operation of the motor 430 (in a fluid flow control mode, FIG. 5, Block 600) above its rated speed (FIG. 5, Block 610) at, for example, low fluid pressures so that generally a higher (e.g. excess) and up to a maximum fluid flow rate may be achieved in the hydraulic system than can otherwise be provided by the controller controlling the pump operation at the rated speed of the motor. In one example the motor 430 may be operated at a predetermined speed so that the pumps 440, 450 operate up to about a maximum speed allowed for the lowest rated pump (FIG. 5, Block 615). In alternate embodiments the motor may be operated at any suitable speed. As may be realized, operation of the motor 430 so that the pumps 440, 450 operate at about the speed of the lowest rated pump provides for an increased fluid flow from the fixed volume and/or variable volume pumps 440, 450 when compared to a conventional pump system where the motor is operated at a speed no greater than the rated speed of the motor. As may be further realized, in this example, the hydraulic power device 401 includes the pump controller configured for controlling the one (or more) fixed volume pumps 440 (e.g. a vane pumps) and/or one (or more) variable volume pump 450 (which may be a single piston pump), so that the fluid discharge volume from the pump(s) 450 may be varied as desired to limit the power demand on the motor to the motor's rated power value. The discharge volume may be varied by the controller through pump bypassing, as previously described, and/or varying the fluid discharge volume with the variable volume pump. Thus, when the variable volume pump 450 starts to decrease its flow (e.g. reduce displacement of the pump) it does so at a predetermined pressure. The variable volume pump 450 may be configured to load its output shaft to a torque that is proportional to the outlet pressure and pump displacement. Referring again to FIG. 4, there is shown a flow-pressure diagram profile of the hydraulic power device with a combined VFD and pump controller. For example, FIG. 4 illustrates the input power 510PA demand on a motor operating at its rated speed compared to the input power 510 demand on the motor, such as motor 430, operating above its rated speed. The curve representing input power 510 rises in a linear fashion from the origin according to pressure times flow or pressure times displacement times RPM. For example, curve 500PA in FIG. 4 illustrates the fluid output of the same pumps 440, 450 when operating the motor 430 at about the motor's rated speed (e.g. the pump controller operates the pumps at or below the speed rating for the lowest rated pump). The curve 500 illustrates the fluid output of the pumps 440, 450 when operating the motor 430 above its rated speed. It is noted that the curve 500 starts at a value equal to the RPM times the total displacement of all pumps. The shaded area 1A illustrates the increased fluid flow, over a conventional pump system, by operating the motor 430 above its rated speed.

In this example, the rated input power of the motor 430 is reached faster because of the increased fluid flow that results from operation of the motor 430 above its speed rating. When the motor 430 reaches about its rated input power the VFD 420 adjusts the speed of the motor so that the rated input power of the motor 430 is not substantially exceeded (FIG. 5, Block 620). At a predetermined load pressure (which may correspond to a point at which the motor is operating substantially at its rated input power), such as at point 3A, the variable volume pump 450 may not decrease its displacement until a higher pressure where it may demand full power from the motor on its own. Because the pressure at the outlet of the pumps 440, 450 may be dictated by the hydraulic load then the only thing left to vary is the RPM. The VFD 420 may be configured to vary the RPM of the motor 430 by decreasing the speed of the motor 430 so that the fluid flow is decreased and the power required by the motor 430 does not substantially exceed the power rating for the motor 430. As an example, even though the VFD 420 may be commanded to effect running the motor 430 at a predetermined RPM, the VFD may start slowing down the motor 430 when the rated power is reached at, for example, point 3A. It is noted that because the power may be proportional to torque times RPM at the motor, the VFD 420 can manipulate the RPM to limit the power of the motor 430. The curve 500 between points 3A and 3B reflects the decrease in the speed of the motor where the corresponding flat portions of the curve 510 indicate a substantially constant power. The curve 500 between points 3A and 3B illustrates a decreasing flow, not because the displacement of the pumps 440, 450 changes but because the speed of the motor 430 (and hence the pumps) changes. At a second predetermined load pressure, such as at point 3B, the controller 410, for example, causes hydraulic valving at bypass line 480 to divert fluid flow generated by one of the pumps 440, 450 back to the tank 460 without entering the system flow in conduit 455 (FIG. 5, Block 630). In this example the fluid flow from the fixed volume pump 440 is directed directly back to the tank 460. In one example, the flow from fixed volume pump 440 can be diverted back to tank 460 by direct hydraulic control (at a predetermined pressure setting) or by logic control of any suitable controller, such as for example controller 410, based on any suitable system parameters. For exemplary purposes only, a pressure relief valve (or other suitable valve) 441 may direct the fluid flow from the fixed volume pump 440 directly back to the tank 460 at the predetermined load pressure independent of any commands from, for example, the controller 410. In alternate embodiments, the flow from the fixed volume pump 440 may be diverted directly back to the tank 460 in any suitable manner. As may be realized, in alternate embodiments where the hydraulic power device includes more than two pumps, the flow from any suitable number of the more than two pumps may be diverted directly to the tank without entering the system fluid flow. As may also be realized, because the motor 430 drives both of the pumps 440, 450 the fixed volume pump 440 may continue to be driven by the motor when the flow from the fixed volume pump is diverted directly to the tank 460 (e.g. the fixed volume pump may be driven substantially load free). In alternate embodiments there may be a suitable drive coupling that disconnects the fixed volume pump 440 from the motor 430 at a predetermined pressure of the hydraulic system.

Substantially upon directing the fluid flow from the fixed volume pump 440 back to the tank 460 the fluid flow in the hydraulic system falls because of the change in total displacement of the pumps. The decrease in fluid flow within conduit 455 and the corresponding decrease in the power demand on the motor are illustrated respectively in FIG. 4 by lines 2A and 2B. The VFD 420 is again commanded to adjust the speed of the motor 430 to the predetermined RPM above the motor's rated speed (FIG. 5, Block 640) because the power demand on the motor at this pressure and displacement may be less than the motor's rated power. This allows the remaining pump(s) (e.g. variable volume pump 450) to be operated at substantially the rated speed of the lowest rated pump (FIG. 5, Block 645) without overloading the motor 430. In alternate embodiments, the motor may be coupled to each of the pumps (e.g. fixed and variable volume pumps) such that, for example, the fixed volume pump may be de-coupled from the drive system so that the motor may operate the variable volume pump at about its rated speed without fear of exceeding the rated speed of the fixed volume pump, if the variable volume pump has a higher speed rating than the fixed volume pump. As can be seen in FIG. 4, the amount of fluid flow provided within conduit 455 (e.g. after the fluid flow and power drops indicated by lines 2A and 2B) when the motor 430 is operated above its rated speed is increased when compared to the fluid flow indicated by line 500PA of a motor operated substantially at its rated speed. The shaded area 1B illustrates the increased fluid flow, in accordance with the exemplary embodiments, over a conventional pump system that operates the motor at the motor's rated speed.

As the pressure within, for example, conduit 455 continues to rise due to, for example, the hydraulic load, the flow remains substantially constant because the variable volume pump 450 has not yet reached the pressure (e.g. point 5A) at which the displacement of the variable volume pump 450 changes. As may be realized, the motor 430 driven by the VFD 420 reaches the power rating of the motor 430 faster and at a lower pressure because of the increased fluid flow. When the pressure, corresponding to the pressure at point 5A is reached the motor 430 may be substantially at its rated power and the VFD 420 may be configured to begin reducing the speed of the motor. As the fluid pressure continues to increase, such as between point 5A (which substantially corresponds to when the rated motor power is reached) and point 5B, the VFD 420 may continue to adjust the speed of the motor 430 so that the rated power of the motor 430 is not substantially exceeded (FIG. 5, Block 650) so that the motor 430 is run at a substantially constant power. The VFD 420 may continue to decrease the speed of the motor 430 until the pressure corresponding to point 5B is reached which is substantially where the motor has reached its rated speed. When the speed of the motor 430 falls to about the rated speed of the motor 430 (e.g. at the pressure corresponding to point 5B) the torque-limiting (e.g. constant power) control (e.g. which may be part of the pump controller) of variable volume pump 450 may be configured to reduce fluid flow output by the pump 450 by decreasing the volume of the pump 450 (FIG. 5, Block 660). As the pressure continues to rise the variable volume pump 450 delivers less flow while substantially maintaining a load which is the rated power of the motor. In the torque-limiting control mode a torque limit of the motor 430 is set to a predetermined value, for example, substantially equal to the rated torque of the motor 430. In alternate embodiments the torque limit may be set to any suitable torque value. In one example, a controller of the variable volume pump 450 controls the flow of the pump (e.g. within, for example, the pressure range indicated by line section 6 of FIG. 4) after the variable volume pump 450 substantially reaches its rated input power to, for example, limit the torque required by the motor 430 to turn the pump. In one example a controller such as controller 410 that is separate from the variable volume pump 450 may control the fluid flow of the pump 450. In alternate embodiments, a controller integral to the pump 450 may control the flow of the pump 450 to limit the torque required by the motor 430. As may be realized, when the pump 450 is operated in the torque-limiting control mode the VFD 420 may not reduce the speed of the motor as long as the power draw from the pump 450 does not substantially exceed the rated limits of the motor 430. In the torque-limiting control mode, the motor 430 may be allowed by the VFD 420 to provide rated torque at substantially all motor speeds below the rated speed of the motor 430, while the pump 450 controls the torque to a limit substantially equal to the motor's rated value.

In another exemplary embodiment, the VFD 420 may be configured to vary the flow from the pumps 440, 450 for controlling functions of the hydraulic power unit 401. For exemplary purposes only, where the load 490 is a hydraulic cylinder the VFD 420 may be configured to adjust the speed of the motor 430 so that the speed of, for example, extension or retraction, of the hydraulic cylinder's actuating rod is slowed before the hydraulic cylinder reaches an end of the cylinder's stroke. The VFD 420 may also be configured to slow a speed of the motor 430 (to e.g. a predetermined pump speed such as the minimum speed the pump will operate) or stop the motor 430 when the machine 400 is idle to, for example, reduce energy consumed by the machine 400. As may be realized, the VFD 420 may stop and restart the motor 430 any suitable number of times substantially without restriction.

In one example, the disclosed embodiments may be integrated into hydraulic power units for the recycling industry such as those described above with respect to FIG. 3A. Generally the recycling industry uses fixed speed motors to drive hydraulic pumps for recycling equipment. In one example, the fixed speed motors include motors rated at 1500 rpm at 50 Hz and motors rated at 1800 rpm at 60 Hz. The pumps used along with these motors are generally rated for higher speeds than the motors. The exemplary embodiments described herein allow one or more pumps to operate at substantially their rated speeds by operating the motors above a rated speed of the motors. The exemplary embodiments also allow for substantially matching the motor speed to pump capability to better utilize the motor power such as in areas 4 illustrated in FIG. 4.

It should be understood that the foregoing description is only illustrative of the embodiments. Various alternatives and modifications can be devised by those skilled in the art without departing from the embodiments. Accordingly, the present embodiments are intended to embrace all such alternatives, modifications and variances that fall within the scope of the appended claims.

What is claimed is:

1. A hydraulic power device for effecting operation of at least one load, the hydraulic power device comprising:

a motor having a predetermined motor speed rating and motor power rating;

at least one pump operably coupled to the motor, the at least one pump being configured to provide, to the at least one load, a first hydraulic fluid flow at the predetermined motor speed rating and a second hydraulic fluid flow at the predetermined motor speed rating, the first hydraulic fluid low being different than the second hydraulic fluid flow; and a variable frequency drive connected to the motor, the variable frequency drive being configured to effect operation of the motor at a speed above the predetermined motor speed rating such that the at least one pump operates to provide an excess hydraulic fluid flow to the at least one load during operation of the motor substantially above the predetermined motor speed rating where the excess fluid flow is greater than at least one of the first hydraulic fluid flow and the second hydraulic fluid flow.

2. The hydraulic power device of claim 1, wherein the at least one pump comprises at least two pumps, the variable frequency drive being configured to operate the motor so that the at least two pumps are simultaneously operated at a speed rating corresponding to a speed rating of a lesser rated one of the at least two pumps.

3. The hydraulic power device of claim 2, wherein the variable frequency drive is configured to vary a speed of the motor to limit power delivered by the motor to the motor power rating when operating above the predetermined motor speed rating.

4. The hydraulic power device of claim 2, further comprising an hydraulic fluid tank connected to the at least two pumps and at least one valve disposed between the hydraulic fluid tank and at least one of the at least two pumps, the at least one valve being configured to divert a fluid flow from the at least one of the at least two pumps directly to the hydraulic fluid tank when a load pressure of the hydraulic system reaches a predetermined load pressure.

5. The hydraulic power device of claim 1, wherein the at least one pump comprises at least one of a fixed volume pump and at least one variable volume pump.

6. The hydraulic power device of claim 1, further comprising a controller connected to the at least one pump, the controller being configured to effect controlling an amount of fluid flow generated by the at least one pump when a speed of the motor is below the predetermined motor speed rating for limiting an amount of torque produced by the motor to a substantially constant torque.

7. The hydraulic power device of claim 6, wherein the variable frequency drive is further configured to substantially maintain a speed of the motor when the at least one pump is operating in a torque-limiting control mode.

8. The hydraulic power device of claim 1, wherein the hydraulic system is included in a machine, the machine comprising:

a frame; and at least one hydraulic cylinder mounted to the frame;

wherein the hydraulic power device is connected to the at least one hydraulic cylinder for effecting operation of the at least one hydraulic cylinder.

9. A hydraulic power device for effecting operation of at least one load, the hydraulic power device comprising:

a motor having a predetermined motor speed rating and motor power rating;

at least one pump operably coupled to the motor, the pump being configured to provide, to the at least one load, a predetermined hydraulic fluid flow at the predetermined motor speed rating;

a pump control operably coupled to the at least one pump for varying the hydraulic fluid flow between a first hydraulic fluid flow at the predetermined motor speed rating and a second hydraulic fluid flow at the predetermined motor speed rating, the first hydraulic fluid flow being different than the second hydraulic fluid flow; and a variable frequency drive connected to the motor, the variable frequency drive being configured to effect operation of the motor at a speed above the motor speed rating such that the at least one pump operates to provide an excess hydraulic fluid flow to the at least one load during operation of the motor substantially above the speed rating, the excess hydraulic fluid flow being greater than at least one of the first hydraulic fluid flow and the second hydraulic fluid flow.

10. The hydraulic power device of claim 9, wherein the at least one pump comprises at least two pumps, the pump control being configured to allow simultaneous output from each of the at least two pumps for effecting the first hydraulic fluid flow and to divert a fluid flow from at least one of the at least two pumps for effecting the second hydraulic fluid flow.

11. The hydraulic power device of claim 10, further comprising an hydraulic fluid tank connected to the at least two pumps, the pump control being configured to divert the fluid flow from the at least one of the at least two pumps directly to the hydraulic fluid tank when a load pressure of the hydraulic system reaches a predetermined load pressure.

12. The hydraulic power device of claim 9, wherein the variable frequency drive is configured to decrease a speed of the motor when the motor is operating above the motor speed rating so that the motor power rating is not substantially exceeded as a load pressure increases.

13. The hydraulic power device of claim 9, wherein the pump control is configured to effect controlling an amount of fluid flow generated by the at least one pump when a speed of the motor falls below the predetermined motor speed rating for limiting an amount of torque produced by the motor to a substantially constant torque.

14. The hydraulic power device of claim 13, wherein the variable frequency drive is further configured to substantially maintain a speed of the motor where the amount of torque depends on a hydraulic load of the at least one pump.

15. The hydraulic power device of claim 9, wherein the variable frequency drive is configured to substantially stop the motor or run the motor at an idle speed corresponding to a predetermined pump speed when the machine is idle and restart or increase the speed of the motor above the idle speed when the machine is in use.

16. The hydraulic power device of claim 9, wherein the excess hydraulic fluid flow is greater than each of the first hydraulic fluid flow and the second hydraulic fluid flow.

17. A method comprising:

operating, with a variable frequency drive, a motor in a hydraulic power device at a speed above a speed rating of the motor; and operating, with the motor, at least one pump in the hydraulic pump system such that the at least one pump operates to provide a first hydraulic fluid flow and a second hydraulic fluid flow to at least one load, where the first hydraulic fluid flow is different than the second hydraulic fluid flow, and an excess hydraulic fluid flow to the at least one load during operation of the motor substantially above the speed rating, wherein the excess hydraulic fluid flow is greater than at least one of the first hydraulic fluid flow and the second hydraulic fluid flow, the first hydraulic fluid flow and the second hydraulic fluid flow being generated when the motor is operated at the speed rating of the motor.

18. The method of claim 17, further comprising decreasing a speed of the motor with the variable frequency drive such that an input power of the motor substantially does not exceed an input power rating of the motor.

19. The method of claim 18, further comprising diverting a fluid flow of one of the at least one pump directly to a hydraulic fluid tank when a load pressure reaches a predetermined pressure.

20. The method of claim 19, wherein the at least one pump comprises a fixed volume pump and a variable volume pump.

21. The method of claim 19, further comprising adjusting a speed of the motor with the variable frequency drive when a load pressure reaches a second predetermined pressure to substantially maintain an input power of the motor substantially at a rated input power of the motor.

* * * * *